July 5, 1938.  J. THEIS  2,122,967
LUG
Filed Oct. 21, 1936   3 Sheets-Sheet 1

Inventor
Joseph Theis

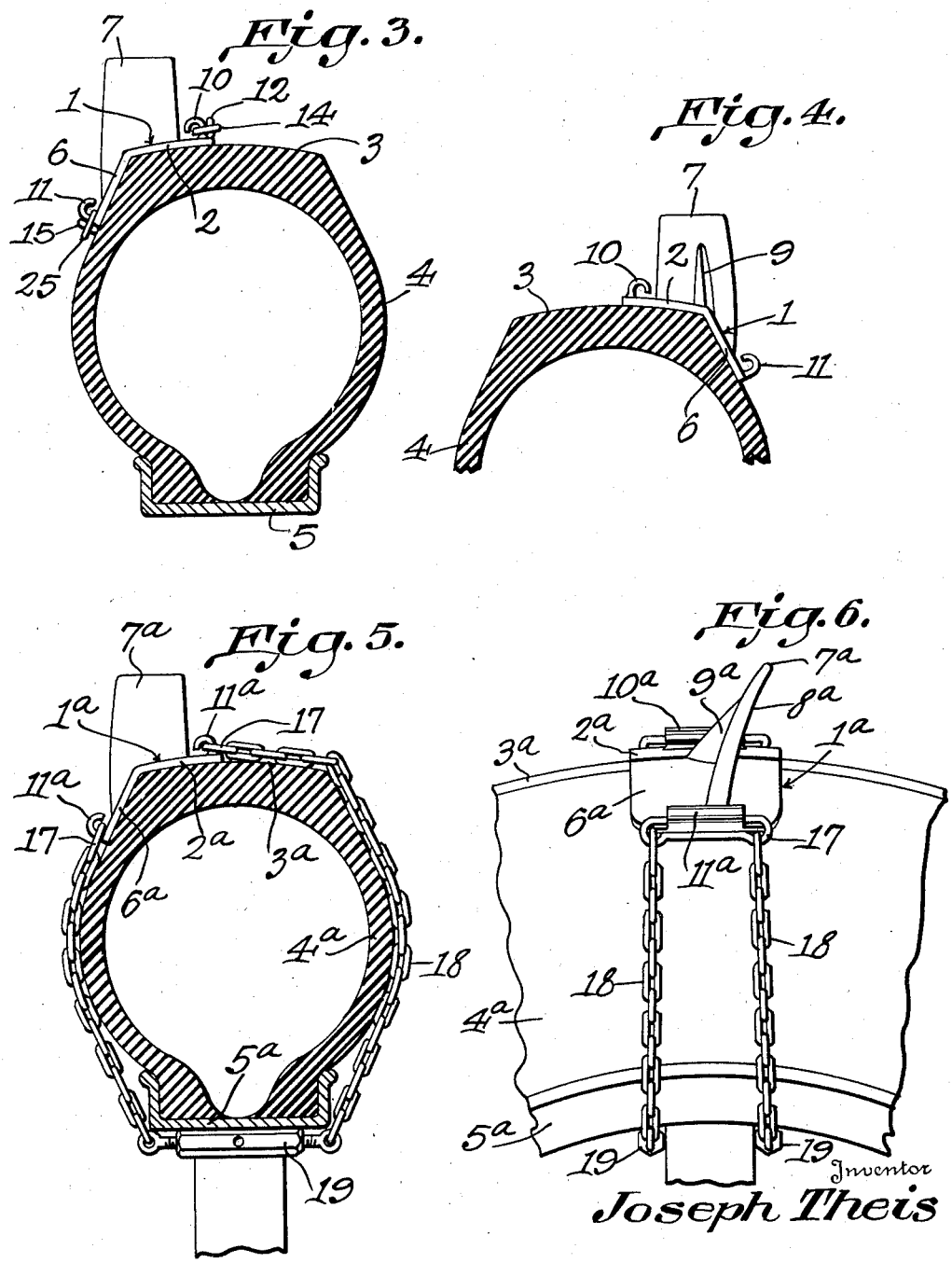

July 5, 1938.   J. THEIS   2,122,967
LUG
Filed Oct. 21, 1936   3 Sheets-Sheet 3

Inventor
Joseph Theis
By CA Snow Co.
Attorneys.

Patented July 5, 1938

2,122,967

UNITED STATES PATENT OFFICE 2,122,967

LUG

Joseph Theis, Hutchinson, Kans.

Application October 21, 1936, Serial No. 106,907

5 Claims. (Cl. 152—228)

This invention aims to provide a traction lug having great strength, and adapted for use in a novel way on a vehicle tire. The invention aims, further, to provide novel means for holding the lug on the tire.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 3 is a cross section showing one side of the cleat on the tire;

Fig. 4 is a cross section showing the opposite side of the cleat on the tire, parts being broken away;

Fig. 5 is a cross section showing a modified means for securing the cleat or lug to the tire;

Fig. 6 is a side elevation of the structure shown in Fig. 5;

Figure 1:
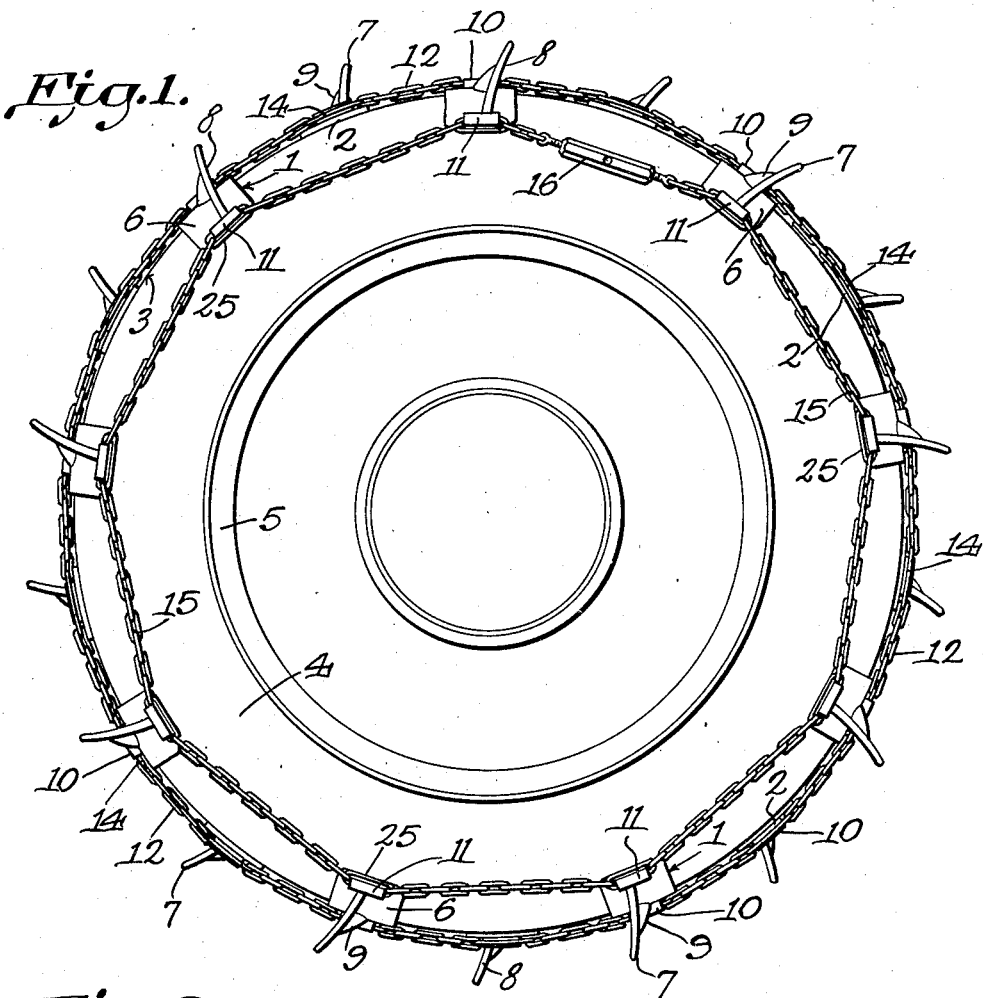
Fig. 1 shows in side elevation, a vehicle tire and rim, the device forming the subject matter of this application being mounted on the tire.

The lug forming the subject matter of this application preferably is made of rigid metal. It comprises a body 1. The body 1 includes a supporting flange 2 of such length as to terminate on the tread 3 of a vehicle tire 4, carried by a rim 5. The body 1 comprises a lateral flange 6 for engagement with the side of the tire 4. The flanges 2 and 6 are arranged in diverging relation.

There is an outwardly projecting transverse cleat 7 on the body 1. The cleat 7 is inclined lengthwise of the body 1, as shown at 8, so that the cleat may better carry the thrust imposed upon it. The cleat 7 is joined to the flange 2 and to the flange 6 as well. The cleat 7, therefore, reenforces both the flanges 2 and 6, and aids in keeping the flanges at the angle to each other shown in Fig. 4. The cleat 7 is joined to the body by a buttress 9. The buttress 9 is located at the place where the flanges 2 and 6 are joined together. Due to this circumstance, the buttress 9 reenforces the body 1 at the angle formed by the parts 2 and 6. The buttress 9, of course, sustains the cleat 7, to withstand the thrust imposed upon it. The flange 2 of the body 1 has an inner anchoring element 10, which may be an inwardly facing hook. The flange 6 of the body 1 has an outer anchoring element 11, which is also an inwardly facing hook.

Figure 2:
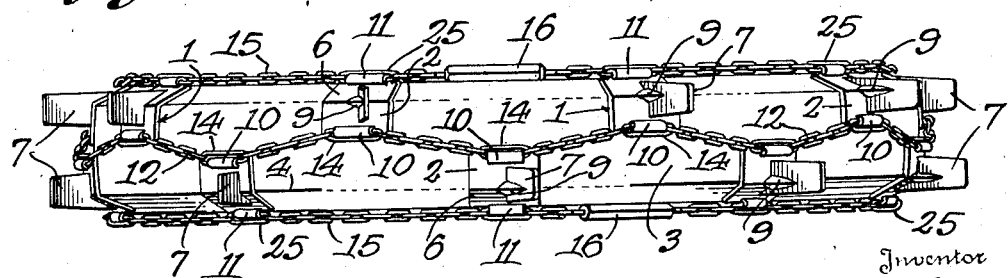
Fig. 2 is a top plan of the structure shown in Fig. 1.
Figure 7:
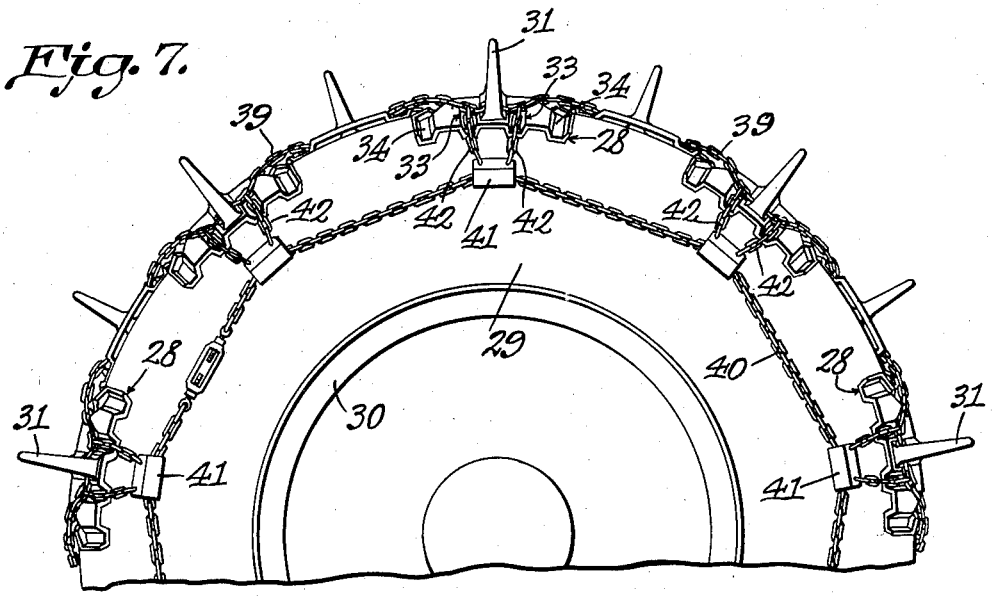
Fig. 7 shows a modified form, mounted on a tire.
Figure 8:
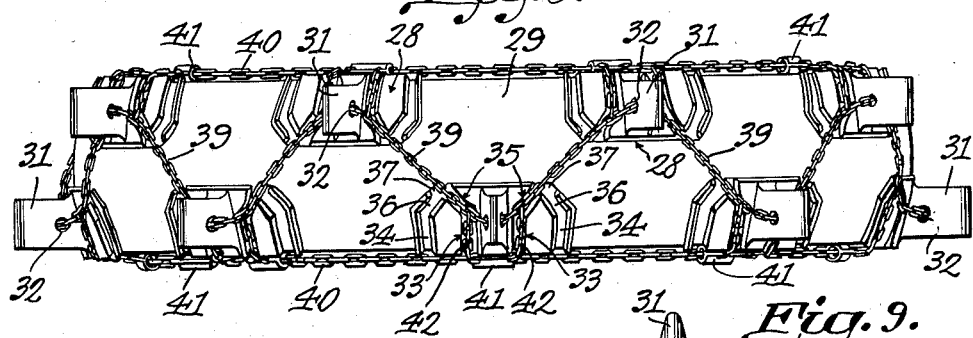
Fig. 8 is a top plan of the structure shown in Fig. 7.
Figure 9:
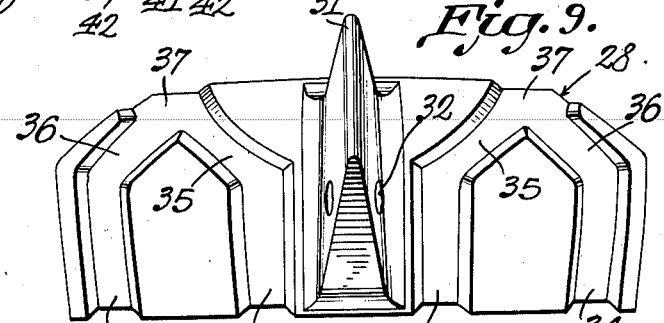
Fig. 9 is a top plan of the lug of Figs. 7 and 8.

The lugs are placed on opposite sides of the tire 4, in alternating relation, circumferentially of the tire, the flanges 2 extending inwardly in opposite directions, in adjacent lugs. This is shown in Fig. 2. A zigzag ring, preferably a flexible chain 12, is engaged with the inner anchoring elements 10 and is located on the tread 3 of the tire 4. The ring or chain 12 has long links 14 engaged with the anchoring elements 10. Side rings 15, such as flexible chains, are engaged with the outer anchoring elements 11. The side rings 15 have long links 25 which receive the outer anchoring elements or hooks 11. Turn buckles or other tightening devices 16 may be interposed in the side rings 15.

In Figs. 1 and 2, a plurality of lugs are used. If but one lug is required, or if a number of lugs less than the number shown in Fig. 1 is called for, the structure shown in Figs. 5 and 6 is resorted to.

In Figs. 5 and 6, parts hereinbefore described have been designated by numerals already used, with the suffix "a". Flexible, inverted, U-shaped binders 18, such as chains, are provided, and are supplied intermediate their ends with long links 17 for engagement with the anchoring elements 10a and 11a. Each end of one chain or binder 18 is connected to the corresponding end of the other chain or binder by a tightening device, such as a turn buckle 19. The turn buckle 19 lies against the inner surface of the rim 5a.

The traction lug is so made that it possesses great strength and is well adapted to withstand the hard use to which it is subjected. Figures 1 and 2 show a novel means for assembling a plurality of lugs with a vehicle tire, and Figs. 5 and 6 show a novel means for assembling a single lug with a vehicle tire.

Figure 10:
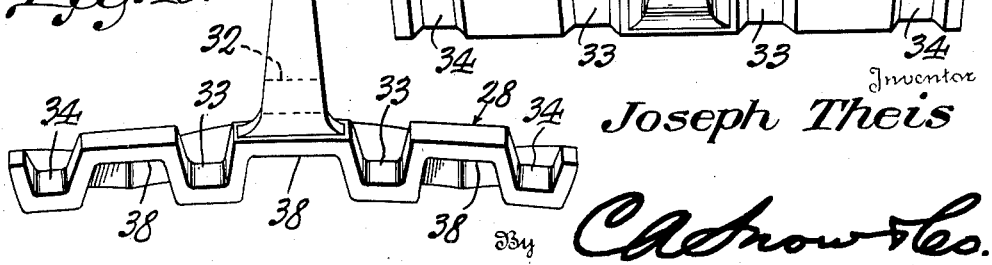
Fig. 10 is an elevation of the lug shown in Figs. 7 and 8.

Passing to the modification shown in Figs. 7 to 10, the body of the lug is marked by the numeral 28 and has a slight curvature, as shown in Fig. 10, so that it will fit on a tire 29 carried by a rim 30. Intermediate its ends, the body 28 has a transverse cleat 31. The cleat is supplied, at a point near to the body 28, with a hole 32. There are inner grooves 33 on the body 28, outer grooves 34 being disposed in approximately parallel relation to the grooves 33. The grooves 33 and 34 are disposed in pairs, on opposite sides of the cleat 31. The grooves 33 have angular portions 35, and the grooves 34 have angular portions 36, the said portions 35 and 36 of the grooves 33 and 34 merging into a mouth 37 located at the inner edge of the body 28. As shown at 38, the body 28 may be hollow, between the grooves 33 and 34, and beneath that part of the body which carries the cleat 31.

The lugs shown in Figs. 7 to 10 are placed on opposite sides of the tire 4, in alternating relation, circumferentially of the tire. A zigzag ring or chain 39 is run through the holes 32 in the cleats 31. The side rings or chains 40 are disposed on opposite sides of the tire 29 and pass through connectors 41. Transverse tie chains or members 42 are supplied. The outer ends of the tie chains 42 are connected to the members 41, the inner ends of the tie chains 42 being connected to the zigzag ring or chain 39, on opposite sides of the cleat 31. The tie chains 42 are shown as occupying the inner grooves 33, but they might occupy the outer grooves 34. Portions of the zigzag ring or chain 39 pass through the angular portions 35 of the grooves 33, as they extend through the holes 32 of the cleats 31.

Having thus described the invention, what is claimed is:

1. A device of the class described, comprising a plurality of traction lugs for use on a tire, each lug comprising a body including a supporting flange of such length as to terminate on the tread of a tire, and a lateral flange for engagement with the side of a tire, the flanges being arranged in diverging relation, an outwardly projecting cleat on each body, inner anchoring elements on the supporting flanges, outer anchoring elements on the lateral flanges, a zigzag flexible ring assembled with the inner anchoring elements, and lateral flexible rings assembled with the outer anchoring elements.

2. A traction lug of the class described, comprising a body provided intermediate its ends and on its outer surface with an outstanding cleat having a hole, the body being provided on its outer surface with grooves which are extended in the general direction of the length of the cleat, the grooves being located on opposite sides of the cleat.

3. A traction lug of the class described comprising a body provided intermediate its ends and on its outer surface with an outstanding cleat having a hole, the body being provided on its outer surface with grooves which are extended in the general direction of the length of the cleat, the grooves being located on opposite sides of the cleat, the grooves including angularly disposed portions which are inclined away from the cleat and extend to one edge of the body.

4. In a device of the class described, lugs each comprising a body provided intermediate its ends and on its outer surface with an outstanding cleat having a hole, the body being provided on its outer surface with grooves extended in the general direction of the length of the cleat, the grooves being located on opposite sides of the cleat, the grooves including angularly disposed portions which are inclined away from the cleat and extend to one edge of the body, the lugs being disposed in oppositely arranged, circumferentially alternating relation, a zigzag ring extended through said angularly disposed portions of the grooves and through the holes of the cleats, side rings, and ties having their outer ends connected to the side rings, the inner ends of the ties being connected to the zigzag ring, on opposite sides of the cleat, the ties fitting in the grooves.

5. A device of the class described comprising a plurality of traction lugs for use on a tire, each lug comprising a body including a supporting flange of such length as to terminate on the tread of a tire, and a lateral flange for engagement with the side of a tire, the flanges of each lug being arranged in diverging relation, the supporting flanges extending inwardly in circumferentially alternating relation upon the tread of a tire, toward the median plane of a tire, and the lateral flanges extending upon the sides of the tire in circumferentially alternating relation, to leave circumferentially alternating portions of the tread and the side wall of the tire free at the inner end of each supporting flange, flexible means connecting the supporting flanges, and flexible means connecting the lateral flanges.

JOSEPH THEIS.